US008788243B2

(12) United States Patent
Peterson et al.

(10) Patent No.: US 8,788,243 B2
(45) Date of Patent: Jul. 22, 2014

(54) PERFORMANCE METRICS GATHERING FROM MULTIPLE VIDEO GAME PLATFORMS

(75) Inventors: Kelly Peterson, Salt Lake City, UT (US); Seth Behunin, West Jordan, UT (US); Fraser Graham, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 482 days.

(21) Appl. No.: 13/026,676

(22) Filed: Feb. 14, 2011

(65) Prior Publication Data

US 2012/0209571 A1 Aug. 16, 2012

(51) Int. Cl.
*G06F 11/30* (2006.01)
*G06F 11/36* (2006.01)
*G06F 11/34* (2006.01)

(52) U.S. Cl.
CPC ........ *G06F 11/3616* (2013.01); *G06F 11/3466* (2013.01); *G06F 11/3409* (2013.01); *G06F 11/3495* (2013.01); *G06F 11/3664* (2013.01)
USPC ........... 702/186; 702/122; 702/182; 702/183; 714/37; 714/38.1; 714/47.1; 463/42

(58) Field of Classification Search
USPC ......................................... 702/122, 183, 186
See application file for complete search history.

(56) References Cited

U.S. PATENT DOCUMENTS

| 7,797,136 | B2* | 9/2010 | Klein et al. | 702/186 |
|---|---|---|---|---|
| 2002/0049962 | A1* | 4/2002 | Kelbaugh et al. | 717/128 |
| 2006/0094504 | A1 | 5/2006 | Polchin | |
| 2006/0258416 | A1 | 11/2006 | Crawford | |
| 2006/0287096 | A1 | 12/2006 | O'Kelley, II et al. | |
| 2007/0060329 | A1* | 3/2007 | Martin | 463/29 |
| 2007/0082741 | A1* | 4/2007 | Xu | 463/43 |
| 2007/0105607 | A1* | 5/2007 | Russell et al. | 463/1 |
| 2009/0113303 | A1* | 4/2009 | Goossen et al. | 715/719 |
| 2010/0144430 | A1* | 6/2010 | Graham et al. | 463/29 |
| 2010/0144443 | A1* | 6/2010 | Graham et al. | 463/42 |
| 2010/0144444 | A1* | 6/2010 | Graham | 463/42 |
| 2010/0146060 | A1* | 6/2010 | Graham | 709/206 |

(Continued)

FOREIGN PATENT DOCUMENTS

| WO | 03009135 A2 | 1/2003 |
|---|---|---|
| WO | 2006055840 A2 | 5/2006 |

(Continued)

*Primary Examiner* — Sujoy Kundu
*Assistant Examiner* — Paul D Lee
(74) *Attorney, Agent, or Firm* — Marsh Fischmann & Breyfogle LLP; Kent A. Lembke

(57) ABSTRACT

A system and method for performing performance testing of video game software from a host computer or external to the game platforms. The system includes a plurality of game platforms, of one, two, or more configurations, running a video game and a communications hub communicatively linked with the game platforms. The testing system includes a metrics gathering framework linked with the communications hub. During operation, the metrics gathering framework requests a metric value from the game platforms via the communication hub, receives the metric values from the game platforms, and stores the metric values in memory of the computer system. In this manner, the majority of the performance test is performed externally or "off-console" so as to avoid polluting the testing environment such as by hindering game performance. The testing may include determining a metric value is out-of-tolerance, and, in response, requesting additional performance data to facilitate troubleshooting.

17 Claims, 9 Drawing Sheets

(56) References Cited

U.S. PATENT DOCUMENTS

2010/0161496 A1* 6/2010 Zalewski .................... 705/80
2012/0084058 A1* 4/2012 Sowerby et al. ............. 702/186
2012/0311387 A1* 12/2012 Santhosh et al. ............ 714/33

FOREIGN PATENT DOCUMENTS

| WO | 2006058485 A1 | 6/2006 |
| WO | 2006124811 A2 | 11/2006 |
| WO | 2008091101 A1 | 7/2008 |

* cited by examiner

PERFORMANCE METRICS GATHERING FROM MULTIPLE VIDEO GAME PLATFORMS

BACKGROUND

1. Field of the Description

The present description relates, in general, to video game development and communications between development tools and video game platforms, and, more particularly, to systems and methods for remotely gathering performing metrics, such as frames per second, from two or more game platforms running a video game (e.g., a number of platforms or consoles or a "testing farm" concurrently running a game during performance or load testing). The metric gathering is "remote" in the sense that a majority (if not nearly all) the metrics gathering software (e.g., a performance metrics framework) is run on a computer or machine separate from the game hardware or console, and the retrieved data is stored external to each of the game platforms for further processing.

2. Relevant Background

The video game market has moved from a smaller niche market to a multi-billion dollar market. The demand for new video games is growing rapidly as the size and demographics of game players continues to expand. Development is complicated because video games used to be made for only one or two game platforms, but now there is a demand for video games that can be sold on numerous platforms including standalone game consoles, portable and desktop computers, handheld portable gaming devices, and other electronic devices such as cellphones, digital music players, and tablet computers (collectively termed "game platforms"). As a result, there is significant competition among game developers to create video games to meet the growing demand in a timely and efficient manner and, often, there is a requirement that each of these new games be able to run as desired (e.g., similarly) on differing game platforms, devices, or consoles.

Large-scale, commercial video games are typically created by large development teams with the development process taking one to three years and costing millions of dollars. A development team may include producers to oversee production, game designers, artists, programmers, level designers, sound engineers, and testers with some team members handling more than one role. The development team works in a collaborative manner to create game content (or game assets) and game code, which together may be thought of as a game application, which can be run by a gaming engine on a particular game platform to provide the game to a player.

For example, programmers may write new source code, artists may develop game assets such as characters or scene objects, coloring schemes, textures, 3D models of game elements, and the like, sound engineers may develop sound effects and music, writers may create character dialog, and level designers may create advanced and eye-catching levels. To support these team members, numerous game development tools, such as Microsoft XNA, Maya from Autodesk, Inc., and the like, are now available for use in designing and creating game content including creating and modeling characters and even for defining game logic (e.g., how high a character jumps, how much life does a character gain or lose based on a game event, how fast does a character or game element move, and so on). Additionally, each video game console or platform developer typically will make a software development kit (or SDK or devkit) available to game developers, and each SDK may include applications or tools that are useful in creating new video games. Each SDK may also include a communications library and/or interface (e.g., platform communications data) to facilitate communications with a game platform (e.g., the platform running a game under current development or running a built game for testing or use by a developer to see how a new character, asset, game parameter, or the like is working in the game).

Another ongoing challenge for video game developers is how to best complete performance or load testing. During game development, there is typically a need to gather performance metrics from the game platform or console, such as current frames per second (FPS). These performance metrics are used by game developers to determine or verify how well the game application is running on a particular platform such as in terms of frame rate (e.g., FPS), memory (e.g., megabytes used and remaining on the platform), and even how these and other resources are being used by the various subsystems of the game platform including the physics simulation subsystem, the rendering subsystem, the artificial intelligence subsystems, and the like.

Presently, a custom solution is designed for each game platform, and the custom solution or on-platform metrics gatherer acts to determine which metrics to track and gather and how to transmit this information from the game platform to a developer's computer system. Such custom solutions have presented a number of problems. The custom metric gathering tools are time consuming and expensive to develop and maintain. Additionally, writing a custom software communications solution on a per-platform basis led to divergence between both the way the information was transmitted and the format of the reported metrics, which made aggregation and analysis of metrics data from varying game platforms difficult and more complex.

In some existing performance testing systems, the on-platform gathering tool writes a fixed (or predefined) set of performance metrics to a file on the game platform or console. This is problematic since file systems differ significantly between differing types of game platforms, which makes aggregation and analysis of the data more complex. Further, some game platforms may not have enough disk space to store all the metrics that a developer may want to gather from the game. In addition, some game platforms do not have a built-in hard drive so that the metrics cannot be stored to such a file. Storing the metrics on the game platform also requires the data to later be mined from a text file, and such data mining can be time consuming and vary with each platform type. Further, the data mining requires human supervision that slows down the feedback loop of information back to the game developers.

Significantly, it is also undesirable to have the performance metrics gathering application to be run on the same machine or platform that is running the video game being performance or load tested. Such operations can use memory and processing time such that proper testing practices are violated as the testing environment is polluted or changed, which can create inaccurate test results. Specifically, a video game may be created that functions as desired on a platform until the platform hardware is also burdened with performance metric gathering and data storage, which may result in the performance metrics differing from those occurring when performance testing software and files are removed from the platform (e.g., the performance/load test itself may impact the results of the test).

Hence, there remains a need for improved methods and systems for gathering, aggregating, and analyzing performance metrics from various types of game platforms running game applications or software that is under development. Preferably, such methods and systems would facilitate testing games created for use on a variety of differing video game platforms (e.g., performance or load test of a game on two or more differing game consoles). Further, it is preferred that the metrics gathering methods and systems be adapted to better comply with testing protocols than prior performance/load testing by not significantly modifying the test environment (e.g., not polluting the test by altering operation of the platform hardware or the game itself).

SUMMARY

The present description addresses the above problems by providing methods and systems for automating testing of video game software. An exemplary test system includes a testing framework (or suite of software) running on a test-hosting computer system or device that is communicatively linked with a plurality of game platforms (e.g., the same or differing game consoles) via a communications hub.

The hub runs a hub communications application or module that has access to the data or knowledge of how to connect and communicate with each video game platform in the testing system or network (e.g., has access to platform communication libraries (such as those provided with game platform SDKs or the like) that may be thought of as communication data sets or libraries). The testing framework may be operated by a test engineer such as via graphical user interface (GUI) to retrieve one or more test scripts from the test-hosting computer system's memory, and then process the script and issue test instructions/orders via the communications hub to a set of the game platforms. The game platforms perform the test steps/functions and return test results/data back to the testing framework, via the communications hub, for further processing. Note, in some cases, the testing framework may run in an unsupervised fashion (alleviating the need for a GUI) such as with a command line version so that this process can be initiated on a timer, e.g., performed once every 24-hour period (nightly, for example) or once every preset time period (e.g., every 30 minutes or the like).

In this manner, the testing methods and systems provide automated testing that is remote from the game platform or console running the game application so as to avoid changing the game environment and test results. Further, even if a test causes a platform to crash, the testing framework is unaffected and can tally the test run as a failure upon detection of loss of communication with a particular game platform. The test script may call for the concurrent running of the same test on a number of game platforms and/or the distribution of a single larger test over a number of game platforms (e.g., load Levels 1-3 on a first number of game platforms, load Levels 4-6 of the same game on a second number of game platforms, and so on). For example, four different game tests may be run on sets of four game platforms (e.g., a testing farm made up of 16 Xbox® consoles or the like). Using these 16 game platforms that are each running a built game or game under development to simultaneously perform one or more tests allows the developer to receive feedback about the stability of the video game software in one sixteenth of the time previously required. If a developer checks in or introduces code in the game that causes a crash in the game, the testing system is able to terminate a test and alert the developer of the crash (e.g., in several minutes rather than hours or days).

More particularly, a video game testing system is provided for externally testing performance of game software on game platforms. The system includes a plurality of game platforms running a video game and a communications hub communicatively linked with the game platforms. Further, the testing system includes a metrics gathering framework running on a computer system communicatively linked with the communications hub. During operation, the metrics gathering framework requests a metric value from the game platforms via the communication hub, receives the metric values from the game platforms, and stores the metric values in memory of the computer system. In this manner, the majority of the performance test is performed externally or "off-console." In the testing system, messages requesting the metric values are configured based on a client-side communications library providing communication protocols for the communications hub, and the communications hub receives the metric value-request messages and generates game platform test messages from the received messages based on differing communication libraries for each of the game platforms.

In some embodiments, the game platforms are made up of game consoles of at least two hardware and software configurations and the metrics gathering framework is neutral with reference to the hardware and software configurations but its commands/metrics requests are game-specific. During operation of the testing system, a time is associated with each of the received metric values ("when was the metric value measured/collected in the game platform?"), and the metrics gathering platform performs a trending analysis for the metric value over a time period (e.g., provides a tabular report of the data and/or creates a graph showing changes in the metric value over time for the game platforms).

Also, during operations, the metrics gathering platform may compare, for each of the game platforms, the received metric value with a performance tolerance limit. When the tolerance limit is exceeded, the metrics gathering framework may generate a request for additional performance information from the game platform. In such cases, the received metric value is a frame rate (e.g., a value in frames per second (FPS) and the tolerance limit may be 30 FPS or another value). In the FPS example, the additional performance information comprises at least one of processor usage, data associated with memory usage on the game platform, and a screen shot. Further, in response to an out of tolerance metric, the metrics gathering framework may determine a poor performing subsystem of the video game on the game platform. Then, the metrics gathering framework may generate a request for additional performance information from the game platform for the determined poor performing subsystem (e.g., data on the physics simulation, the rendering, or other subsystems of the game software).

DETAILED DESCRIPTION OF THE PREFERRED EMBODIMENTS

Figure 1:
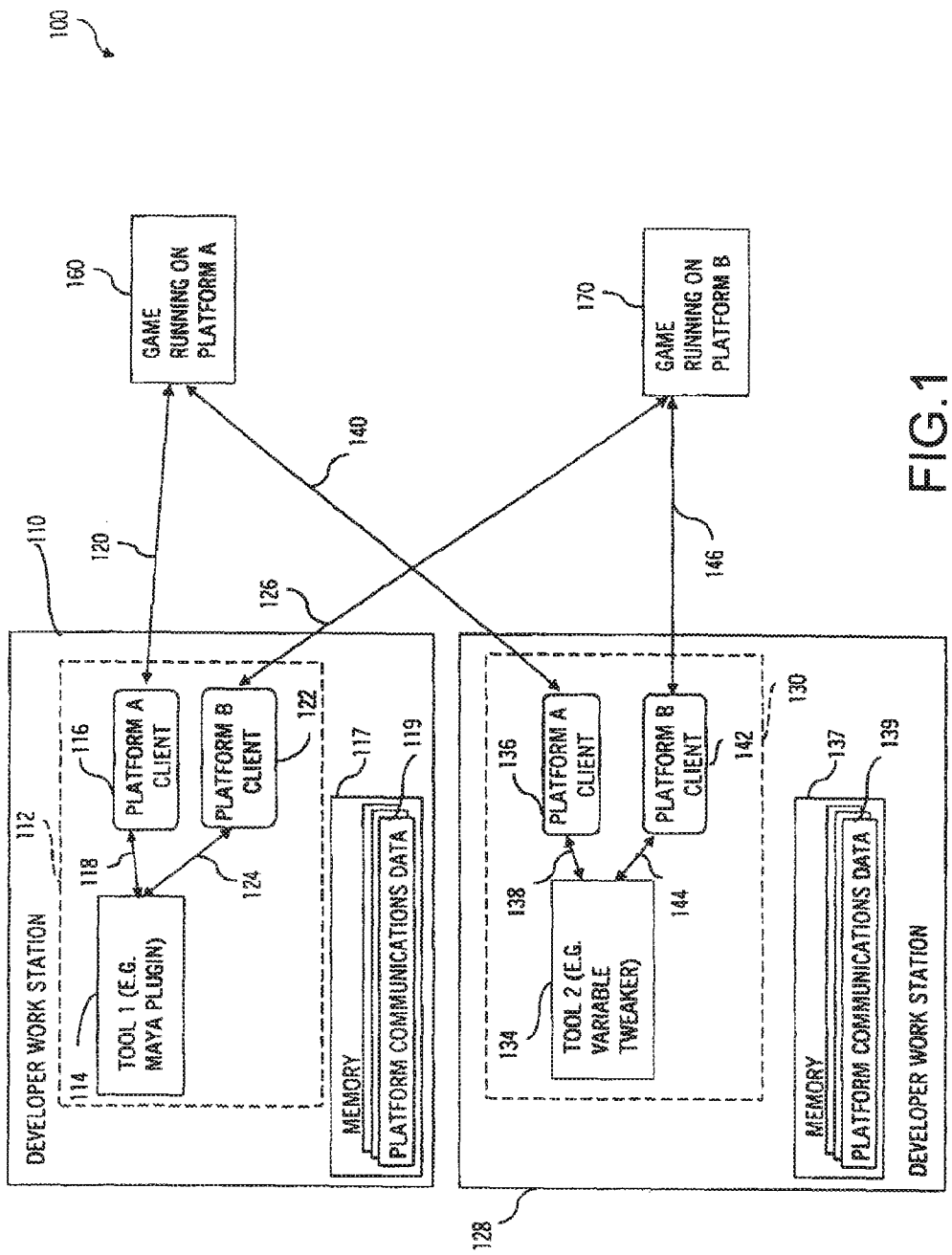
FIG. 1 is a functional block diagram of a video game development system or network configured according to prior communication methods.

Briefly, embodiments discussed in the following description are directed to methods and systems that provide enhanced gathering and analysis of performance metrics from multiple game platforms (a "testing farm") running a video game application. The game platforms may be similar in configuration (e.g., all be Xbox® consoles) or, more typically, may differ in configuration (e.g., some may be Xbox® consoles while others are Playstation® consoles) such that custom metric gathering solutions are not required for each differing console. Once a metrics gathering framework is provided (such as in test-hosting computer) in a testing network or system, the metrics gathering framework functions to gather performance metrics from any number of differing game platforms including Xbox 360®, Playstation 3®, Nintendo Wii®, a Windows® PC, and the like. The metrics are gathered in real time while any number of game platforms are currently running the video game under development and being tested.

In brief, performance testing systems are described that include a metrics gathering framework or application running on a test-hosting computer (e.g., a host PC). The metrics gathering framework functions to cause metrics or performance test data to be transmitted from each running game platform in a testing farm back to the host PC by way of a common communications hub (or communication hub application) that may be on a server between the host PC and the testing farm (or provided on the host PC). The metrics gathering framework may be configured or designed to be game-specific (e.g., is specific code written for the game under development to collect metrics for that particular game that may be useful in its development and performance/load testing) but yet be used across all console types or configurations within a testing farm. The metrics gathering framework communicates with each game platform over a communication hub application to cause the game platform to selectively gather performance metrics and to transmit the metrics via the hub to the metrics gathering framework.

The use of a centralized, external (or remote) metrics gathering framework causes the collected metrics to be unified in that the same metrics are gathered for each platform and the metrics have the same format. In this way, the metrics can be compared against each other by the metrics gathering framework. For example, the framework can readily analyze why one version of the game is using less memory than another version, e.g., determine why the game running on an Xbox® platform uses less memory than the same game running on a Playstation 3® platform.

Since the host PC has received all the metrics data in a common format from the communications hub application, it is then a relatively simple task to either generate a report immediately or to store the data for future and historical analysis such as in a relational database. The timing of when the metrics are gathered is also stored in memory of the host PC or in the relational database, which facilitates graphing performance of each platform type over time (e.g., compare FPS values for the various platforms over time, which may or may not correlate to similar game play/loads on the platforms). The use of a relational database with timing data facilitates use of the metrics data in finding or identifying historical trends in performance analysis. Previously, many game platforms were unable to establish communication with relational databases, and this limitation is removed as the metrics are communicated to the metrics gathering framework, which then allows the host PC to communicate with any available database system.

In part, the performance or load testing methods and systems described herein, including metrics gathering processes, are made possible through the use of hub-based communications (e.g., use of a communication hub application between the metrics gathering framework and the game platforms). With this in mind, the hub application will be described first before turning to an exemplary metrics gathering system and metrics gathering methods according to aspects of this description. For example, the communications hub application may be implemented using the techniques described in U.S. patent application Ser. No. 12/328,619, entitled "Communication Hub for Video Game Development Systems," which is co-owned, which was published Jun. 6, 2010 as U.S. Pat. Appl. Publ. No. 2010/0144443, and which is incorporated herein in its entirety by reference.

Briefly, the communications hub may provide a method for managing communications within a video game development system or network, which may be configured for performance/load testing including metrics gathering from a plurality of differing types of game consoles. With the communications hub, a game development system or network may be provided that lessens the processing overhead, usage complexity, and maintenance requirements for each game development tool used by a game developer by providing a central hub communication application in the development system or network that establishes a communication interface(s) between each tool and differing game platforms. Likewise, such a communication interface(s) may be provided between a metrics gathering framework and a testing farm with a number of game platforms as is discussed beginning with FIG. 6. The hub communication application (or the server running such an application) acts as a message passing hub that extracts (or determines) the recipients (which game platform is to gather and transmit a particular set of performance metrics) for a message issued by a development tool or metrics gathering framework (or software system within such a framework) and transmits the content (e.g., performance metrics (along with timing data/time stamps), game data such as modified game logic to be used by a game engine on a platform, a game asset such as a new character or object in 3D model or other form, and/or a game parameter such as lighting level, texturing, testing orders/instructions, and the like) as-is or with reformatting to the recipients in the game development system or network.

As background, the following description provides examples of particular computers, computing devices, workstations, video game platforms/consoles, communication networking and digital connections, memory devices, and other computing hardware and software resources used in video game development. However, it will be understood that these are only representative examples of useful implementations of the invention and not as limitations to its breadth. Further, embodiments of the invention may be thought of generally as a computer-based method for supporting communications, authoring, and performance/load testing during game development (e.g., while operating a developer terminal, node, PC, workstation, or the like and using one or more video game development tool), the particular software, firmware, and/or hardware used to implement the described methods and functions are also not limiting of the invention, in general, the algorithms, routines, and processes described herein may be implemented upon nearly any computer-readable medium that can cause a computer or computer system to perform a corresponding function.

For example, the hub communication application and metrics gathering framework may be provided as software or programming code for causing a computing device such as a developer's computing device or a central/networked server to perform particular functions as part of creating a game development computing and communication environment and may be stored on a memory device of nearly any node accessible via wired or wireless connections by video game development tools and run on a device that uses one or more processors or CPUs to run the software. The video game development workstations and test-hosting workstations/devices/PCs likely will include a number of input/output devices (I/O devices) such as a keyboard, a mouse or trackball or the like, a touchscreen or pad, a voice recognition mechanism, and the like. A monitor or monitors will also be provided to allow the user to view one or more user interface (such as windows created as part of the computing environment to view and/or access video game tool interfaces and view/modify game data such as game logic, game settings, game assets, game parameters, and the like). Such user interfaces may be nearly any combination of menus, screen designs, keyboard commands, command language, and the like (including in some cases mice, touch screens, and other input hardware such as voice recognition) to allow a user to interact with a computer and with video game digital assets and data stored in memory in a particular computing environment. The invention may also be implemented using one or more data servers that may communicate with the workstations over a digital communications network such as the Internet, a local area network, a wide area network, or the like using any of a number of well-known or later developed communications protocols (wired or wireless), and the browsers and related applications may be provided as web applications accessible in particular computing environments.

To assist in understanding some of the benefits of such a hub-based communication system and method as part of the game development and performance/load testing process, it may be useful to discuss an existing or more conventional game development system 100 as shown in FIG. 1. In a conventional game development system 100, a number of developers may use workstations 110, 128 to present a computing or working environment 112, 130 in which one or more development tools 114, 134 (such as the Maya Plugin, a Variable Tweaker tool, a logic update tool, and the like) are run so as to develop a video game. This game may be run on a number of differing video game platforms or consoles as shown as platform A and platform B with the running games shown as boxes 160, 170. The computing environment 112, 130 of each workstation 110, 128, may include memory or data storage 117, 137 that is used to store a communication/interface library or platform communications data 119, 139. Such communications data may define all or some subset of the messaging formats and transmittal protocols expected by each video game platform, and, typically, each of the sets of platform communications data 119, 139 defines an at least partially different set of rules that must be followed for the tools 114, 134 to communicate properly with the running games 160, 170 on the platforms. If a developer were working with just one platform, this may not be too much of an issue, but, more often, each development workstation 110, 128 and running tools 114, 134 are used to develop a game 160, 170 for use on two, three, or more video game platforms. Hence, it is important for the tools 114, 134 to be able to communicate with each platform or game running 160, 170 on such varying platforms (such as those developed and distributed by Sony, Microsoft, Nintendo, and other gaming platform manufacturers).

Presently, development tools 114, 134 used in the video game industry typically provide no communications or, if they do provide a form of communication, function as shown by using a one-to-one connection 120, 126, 140, 146 between the tool 114, 134 and the running games/platforms 160, 170. To establish communications, the tools 114, 134 may be thought of as creating communication clients 116, 122, 136, 142 for each game 160, 170 that they wish to communicate with during development/operation of system 100. Further, such one-to-one communications may be thought of as requiring the tools 114, 134 to each create and manage communication sockets 118, 124, 138, 144 to allow direct messaging 120, 126, 140, 146 to and from the running games 160, 170. In the system 100, each tool needs to understand how to communicate with each platform 160, 170 separately. For example, a communication link along with messages formatted as required by the communication data 119 for a particular platform 160 likely cannot be used for sending a message with the same content to the other platform 170. In a more concrete example, a certain tool 114 or 134 may use one set of communication data 119, 139 (e.g., information/data provided in a video game platform developer's SDK or the like) to update objects or other game assets/data on a Sony PS3® platform (or first platform) but could not use these same communication techniques/methods to send messages updating the same objects or other game assets/data on a Microsoft Xbox® 360 (or second platform). Further, the one-to-one communication technique has not been useful in allowing tools to communicate between each other or with other tools as the tools 114, 134 generally would need to have explicit knowledge of the other running tools in order to establish a connection.

Figure 2:
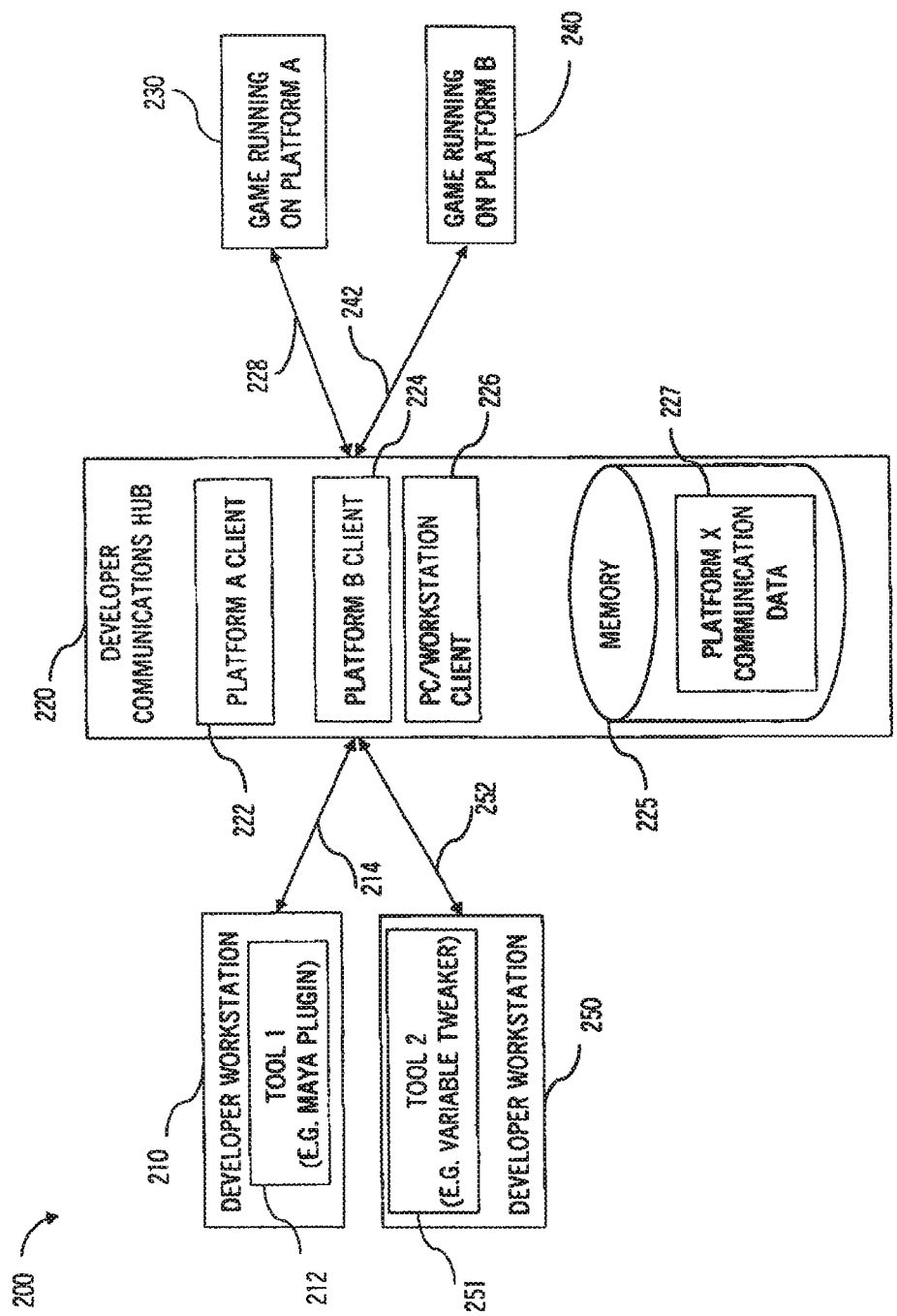
FIG. 2 illustrates a functional block diagram in contrast to the system of FIG. 1 shows a video game development system or network adapted according to an embodiment of the invention with a developer communications hub facilitating communications between game development tools and games running on differing video game platforms and, optionally between the tools themselves.

In contrast, FIG. 2 illustrates a game development system or network 200 that is adapted such that the individual games do not have to have knowledge of the particular platform communications data and/or rules or even what games and/or tools are "listening" or connected to the game network 200. The system 200 again includes a pair of developer workstations 210, 250 that are running video game development tools 212, 251, but only a single connection 214, 252 is maintained/ used by each tool 212, 251 to communicate with both games 230, 240 running on two differing platforms and, optionally, with other tools (which is not typically done within the system 100 of FIG. 1).

The system 200 simplifies game development communications by including a developer communications hub 220 (e.g., a server or other computing device that may take the "server" role for messaging within system 200). The hub 220 runs a central hub communications or message-passing application that abstracts the knowledge of platforms and existence of other tools from the individual tools 212, 251, and such a centralization and abstraction of communications duties allows the tools 212, 251 to communicate with each other and with any game platform 230, 240 without requiring specific knowledge of the intended recipient and potential interfacing, message formatting, and other communication requirements imposed by that recipient. The system 200 does this generally by centralizing the knowledge of how to connect with different platforms 230, 240 into a central hub application and, in some cases, by building a client side communications library into each tool (not shown but used to allow the tools 212, 251 to communicate with the hub application with a relatively simple messaging protocol that can be used for all of its messaging and data transfer in system 200). Such a library may also be used to allow the platforms 230, 240 to connect with the hub 220 (or hub communication application running thereon).

As shown, the hub 220 provides an interface to a client 222 for tools 212, 251 to communicate with games running on a first platform 230 (shown as Platform A) as well as communication clients 224, 226 for tools 212, 251 to communicate with games running on a second platform 240 (shown as Platform B in FIG. 2). The hub 220 includes memory or data storage 225 for storing communications data or libraries 227 (such as those provided in video game SDKs and the like) for each of the platforms 230, 240. The information is used by the hub application running on hub 220 to provide the interfaces between the tools 212, 251 that send the hub-formatted messages over links 214, 252 and games 230, 240 running on differing platforms and linked to hub 220 via links 228, 242. The communications may be managed, in part, by the hub application creating communications clients 222, 224, 226 based on the platform communications data 227 in memory 225.

During operation of system 200, a tool 212 or 251 transmits a message over link 214 or 252 (such as a message to modify a lighting setting or a texturing of an object of the game or so on) that is formatted per the client-side hub library (not shown in FIG. 2). The hub 220 acts to determine which recipients should receive the message content such as one or both of the games on the two platforms 230, 240 and tool 212 or 251. The hub 220 then uses the appropriate communications data/libraries 227 to reformat/translate the message for each recipient (and/or uses the created clients 222, 224, 226 to manage such communications and comply with communication rules). The hub 220 then forwards the message to the interested or determined set of recipients in the system 200. As can be seen from the relatively general illustration of system 200, the tools 212, 251 and games 230, 240 need only know how to talk or communicate with the hub 220, and there is no need for specific knowledge of the communication rules of the intended recipient(s) to send game information or data out onto the network or system 200 and to the recipient(s). In contrast to the system 100 of FIG. 1, the tools 212, 251 do not need to manage communication clients and/or sockets for each possible platform or store/access communications data/libraries for each game platform. Further, the system 200 allows the tools 212, 251 to communicate with each other (as is explained in more detail below).

Figure 3:
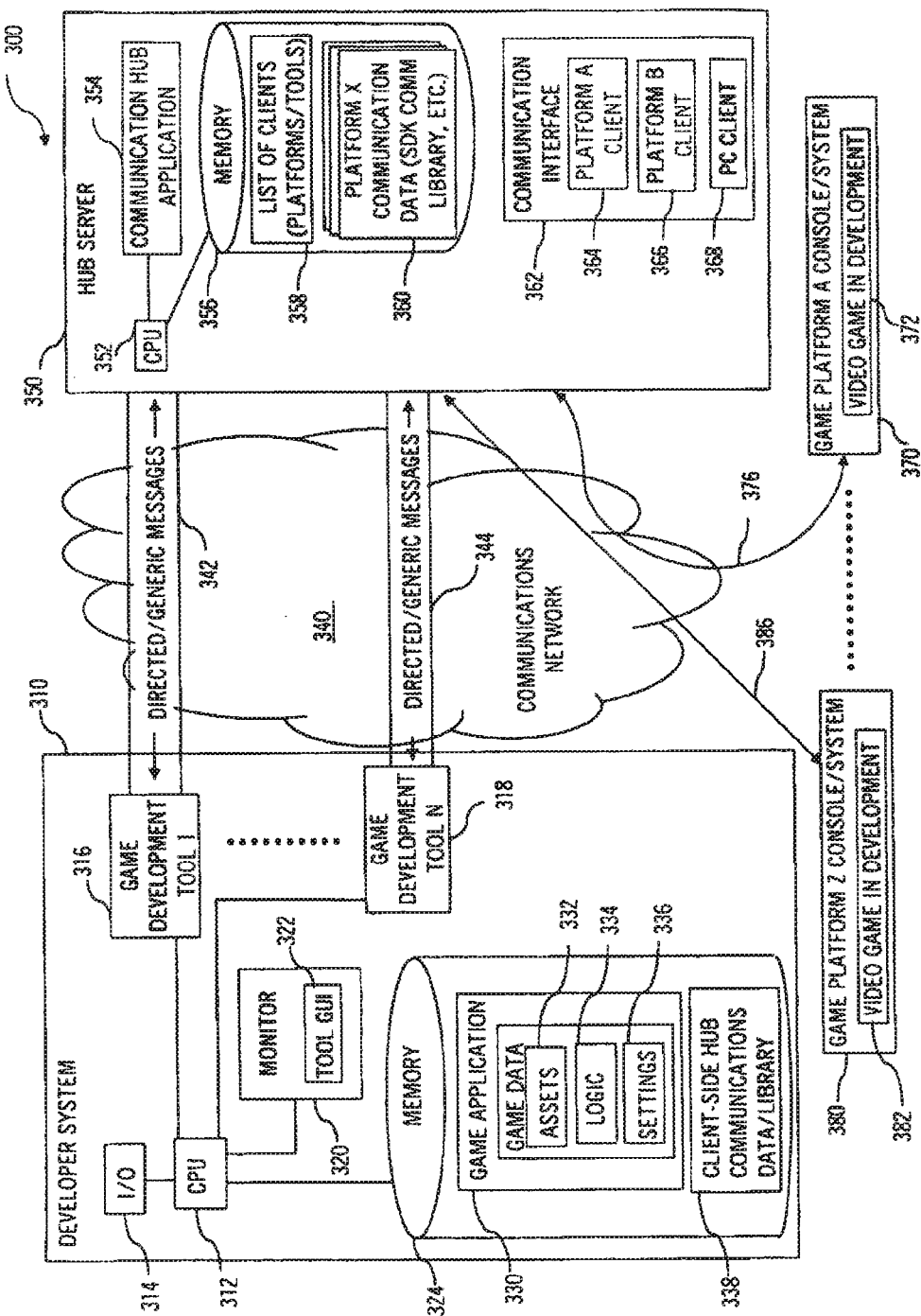
FIG. 3 illustrates a functional block diagram of video game development system or network providing additional detail of an exemplary implementation or embodiment illustrating that games use a client-side communication library (that may be built into each tool) to create or use a single communication socket to transmit and receive game data or development messages from the central hub application.

FIG. 3 illustrates in more detail a video game development system 300 that may be used to implement the communication methods of an embodiment of the invention. In this embodiment, a developer computing system 310 is shown that includes a CPU 312 running two or more video game development tools 316, 318 such as those used to create 3D models, to set or adjust game logic, to create objects, characters, or other game assets, and so on. I/O devices 314 may be provided to allow a developer to interact with the tools 316, 318 and game data, and one or more monitors 320 are included to view tool GUIs 322 and otherwise view/interact with tools 316, 318 and game data. The system 310 further includes memory 324 that stores client-side hub communications data/library 338, and this includes data to enable the tools 316, 318 to communicate with the communication hub application 354 (and through this application 354 with games under development 372, 382 or other ones of the tools 316, 318 (or tools on other systems 310 not shown)). The memory 324 is also shown to include a game application 320 such as a game being developed or a recent build of such a game (or this data may be stored on another memory device accessible by system 310 and other developer systems). The game application 330 includes game data such as game assets 332, game logic 334, and game settings 336, and the game application 330 can be thought of as being defined by this game data; hence, game development includes using the tools 316, 318 to create and modify the game data in memory 324 and/or on a running game 372, 382 on a number of video game platforms/consoles 370, 380.

The system 300 also includes a communications network 340 that is used to connect the developer system 310 with a hub server 350. The hub server 350 includes a CPU 352 that runs a communications hub application 354. The CPU 352 also manages memory 356 that is shown to store a list of clients (e.g., platforms, tools, games or subsystems of games registered with the hub application, and the like) for receiving system communications. The memory 356 also stores platform communication data (e.g., SDK communication libraries for each platform 370, 380) for each platform 370, 380 in the system 300 or expected to be added to/used within system 300. The hub server 350 runs the communication hub application 354, and the application 354 may function to provide a communication interface 362 between the tools 316, 318 and the game platforms 370, 380 (and between tools 316, 318 themselves). To this end, a communication client 364, 366, 368 may be created by the hub application 354 using the platform communication data sets 360 for each platform 370, 380 as well as rules/protocols for communicating with the workstation/system 310.

During operation of the system 300, each of the game development tools 316, 318 may use the client-side hub library 338 as a built-in or runtime communication mechanism to create and manage a hub communication socket or link 342, 344 via network 340 to send messages to and from the hub application 354 on server 350. These messages may include game data such as modifying game logic 334 or an asset 332 on games 372, 382 (e.g., the same game running on two differing platforms). The hub application 354 processes these messages via interface 362 and clients 364, 366, 368 and/or communication data 360 to determine the recipients for the message, to place the message in the expected format for those recipients, and to transmit the message over links 376, 386, 342, 344 as appropriate. The list of clients 358 may include the video games 372, 382 or one of the tools 318 and each message may be sent to one, a set of or all of such recipients depending on the content (who is registered as being interested in that type of content/message) and/or on a recipient list/addressee in the message from the tool 316, 318 (such as to a particular game or game subsystem or to any tools interested in a particular game data).

Figure 4:
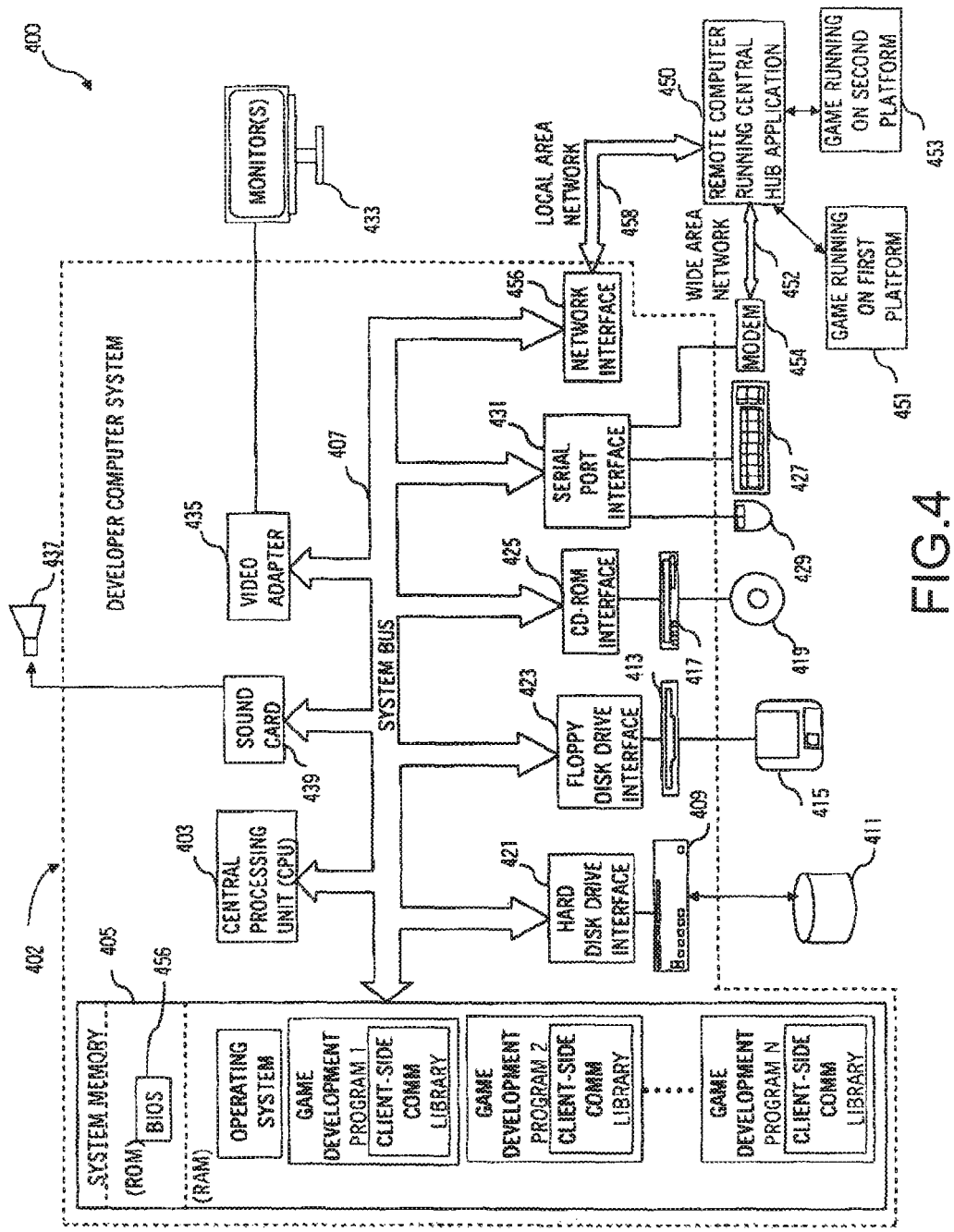
FIG. 4 illustrates a development system or network illustrating in more detail one exemplary computer system useful for implementing the communication methods, authoring methods, testing methods, and other functionality described herein.

FIG. 4 generally illustrates a game development system or network 400 that may be used to implement the hub or centralize communication techniques and other functions/processes described herein including the automated testing functions using a testing framework to communicate via a central communication hub application. The network 400 includes a computer system 402, which typically is used by a game developer (or member of a video game development team) and includes a processing unit or CPU 203 and system memory 205 with one or more game development tools that may be run by CPU 203. As discussed above, each of the game development tools or programs may have a built-in client-side communications library that provides the information required for the program to communicate with a central communication hub application running on a remote computer 250 (or on one of the developer computer systems 402 in a distributed system/network), and, in this manner, messages generated by the game development programs can be relatively simple and/or generic in form and be delivered via the central communication hub application to games running on first and second (or more) platforms 451, 453 that may have differing communication requirements (e.g., differing message configuration/content, differing transmission protocols, differing communication and/or client interfaces, and the like such as may be specified by each platform developer's SDK or a communication library in the SDK or otherwise specified).

A system bus 407 couples various system components including system memory 405 to processing unit 403. System bus 407 may be any of several types of bus structures including a memory bus or memory controller, a peripheral bus, and a local bus using any of a variety of bus architectures. System memory 405 includes read only memory (ROM) and random access memory (RAM). A basic input/output system (BIOS) 456, containing the basic routines that help to transfer information between elements within computer system 402, such as during start-up, is stored in ROM 456. Computer system 402 further includes various drives and associated computer-readable media. A hard disk drive 409 reads from and writes to a (typically fixed) magnetic hard disk 411; a magnetic disk drive 413 reads from and writes to a removable "floppy" or other magnetic disk 415; and an optical disk drive 417 reads from and, in some configurations, writes to a removable optical disk 419 such as a CD ROM or other optical media, and, of course, other removable memory devices may be inserted into and accessed (read and/or writing of data) via a port such as a USB or other communication port in a housing of the system 402. Hard disk drive 409, magnetic disk drive 413, and optical disk drive 417 are connected to system bus 407 by a hard disk drive interface 421, a magnetic disk drive interface 423, and an optical drive interface 425, respectively. The drives and their associated computer-readable media provide nonvolatile storage of computer-readable instructions, programs, procedures, routines, data structures, program modules, and other data for computer system 402 (such as initial installation of the client-side communications library and/or for backup storage/transfer of game application or game assets). In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules such as game development tools, testing routines, and the like may be stored on hard disk 411, removable magnetic disk 415, optical disk 419 and/or ROM and/or RAM of system memory 405. Such program modules may include an operating system providing graphics and sound APIs, one or more application programs, and a testing framework with software systems/program modules or subroutines, and test results and output of processing such test data. A user such as a software tester or developer may enter commands and information into computer system 402 through input devices such as a keyboard 427 and a pointing device or mouse 429. Other input devices may include a microphone, a joystick, a game controller, wireless communication devices, a scanner, or the like. These and other input devices are often connected to processing unit 403 through a serial port interface 431 that is coupled to system bus 407 but may be connected by other interfaces, such as a parallel port interface or a universal serial bus (USB) or by wireless connections. A monitor(s) 433 or other type of display device is also connected to system bus 407 via an interface, such as a video adapter 435, for viewing game development and game testing GUIs (e.g., that may be used for selecting test scripts to initiate automated tests) or other game data.

Computer system 402 may also include a modem 454 or other means for establishing communications over network 452, such as the Internet, a LAN, a WAN, or the like. Modem 454, which may be internal or external, is connected to system bus 407 via serial port interface 431 (or some other interface). A network interface 456 may also be provided for allowing computer system 402 to communicate (e.g., establish communication sockets and the like) with a remote computing device or server 450 via a local area network 458 (or such communication may be via wide area network 452 or other communications path such as dial-up or other communications means). Computer system 402 typically includes other peripheral output devices, such as printers and other standard devices (not shown). Computer system 402 is preferably equipped with an operating system supporting Internet communication protocols and/or other digital communications network protocols and communication interfaces (e.g., to support digital communications with the central communications hub on computer 250 via messages generated and transmitted based on the definitions/requirements of the client-side communication library typically built into the game development programs). Other types of computer systems other than or in addition to the one shown are usable to practice the invention (e.g., a local area network of computers, an interactive television, a personal digital assistant, an interactive wireless communications device, electronic devices with adequate computing capabilities and memory, or the like).

Figure 5:
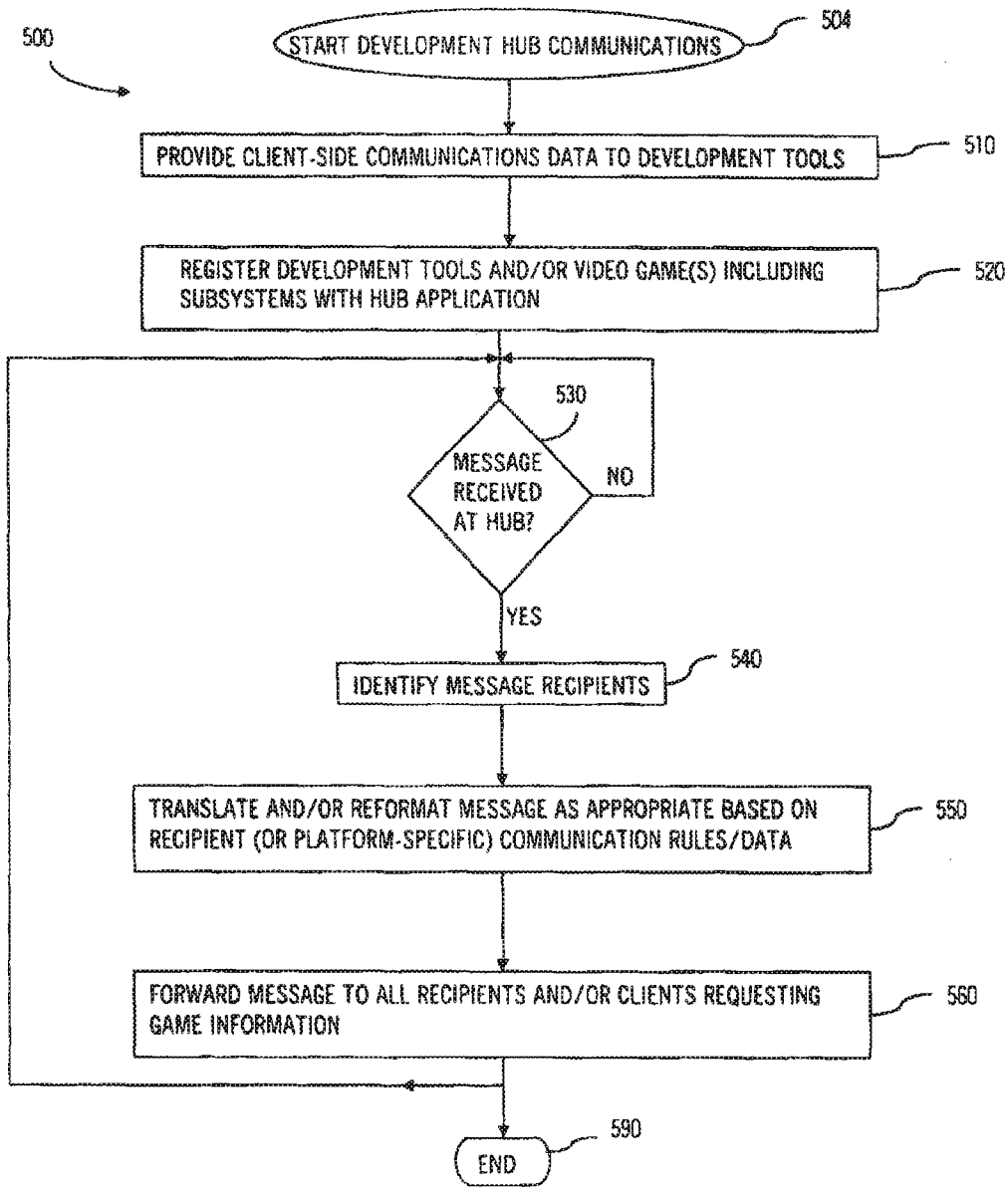
FIG. 5 is flow chart illustrating generally a game development or hub-based communication method of an embodiment of the invention.

FIG. 5 illustrates a video game development communications method 500, as may be implemented by the systems 200, 300, 400 of FIGS. 2-4. At 504, the method 500 starts by loading or providing a central hub application within a video game development system or network. The communications data or libraries for each game platform or console that is being used or may later be connected to the network may be made available to the central huh application. At 510, the method 500 continues with providing client-side communications data or a hub library to each of the development tools or to the workstations that run such tools, and, as discussed below, the tools may include the testing framework. The client side library may be a runtime library stored in the workstation memory. The client-side libraries include the data or information (such as messaging configuration/format and/or other communications protocols) to allow the tools to communicate with the central hub application.

At 520, the method 500 continues with registering development tools (including the metrics gathering framework shown in FIG. 6 used in performance/load testing of game software on game consoles/platforms of a testing farm) and/or video game(s) with the hub application to create a recipient list for the development network or system. Tools may register to be informed when particular game data is altered, testing framework may register to be informed about test results, and the video games typically are registered in a subsystem manner to receiving communications/messages from tools including modified game data (e.g., a materials subsystem, an objects subsystem(s), a texturing subsystem, a lighting subsystem, systems or subsystems of a testing framework, and so on may each register with the hub application for a particular video game running upon a game platform linked to the development system or network). This aspect of the system allows tools and the testing framework to direct messages to a particular subsystem instead of relying on the game to determine the appropriate subsystem itself The method 500 then may include the hub application monitoring the communication network for a next message to be transmitted from a tool or game. When a message is received at the hub, the method 500 continues with the hub application acting to identify message recipients at 540. For example, in some embodiments, the tools may transmit messages in a generic manner with no addressees specified, and in such cases the message may be sent to all recipients on the hub recipient list or a subset interested in a particular type of message or message content. In other cases, the message may be transmitted by the tool in a form that specifies one or more (a set) of recipients for the message, e.g., a message to a game running on one platform or another tool.

At 550, the hub application translates and/or reformats the message as appropriate based on the identified recipients and the communications data (rules, libraries, and the like) associated with each of these identified recipients. For example, a hub-formatted message from a tool may be reformatted or translated to comply with communications data/rules for a first game platform and also for a second game platform. Then, at 560, the method 500 continues with the hub application forwarding the message to all identified recipients or to clients requesting the game information in the message. In some cases, the hub application handles opening communication links or sockets for each platform (and/or for each recipient or the like). The method 500 may continue at 530 with waiting for additional game development or related messages (or more testing instructions, testing data from a game platform, or the like) or end at 590.

Generally, the method 500 may be used for one-to-one communications as a tool or other sender of the development network may specify the recipient or addressee, but the method 500 also supports a one-to-many connection or broadcasting communication methods as a tool can make a change to a particular game data (such as tweak a portion of the game logic) and transmit a generic hub-format message that will be sent by the hub application to all interested recipients (e.g., to all games or game subsystems affected by the change). As a result, a developer does not have to create and send a message for each platform to have the change implemented by running games. Likewise, a performance tester can write game-specific metrics gathering applications once and have that framework's messages/instructions requesting performance metrics properly communicated to a number of game platforms in a testing farm such that the framework code may be written in a relatively generic form (rather than specific for each platform to allow embedding within the game itself or otherwise run uniquely on each platform type).

Figure 6:
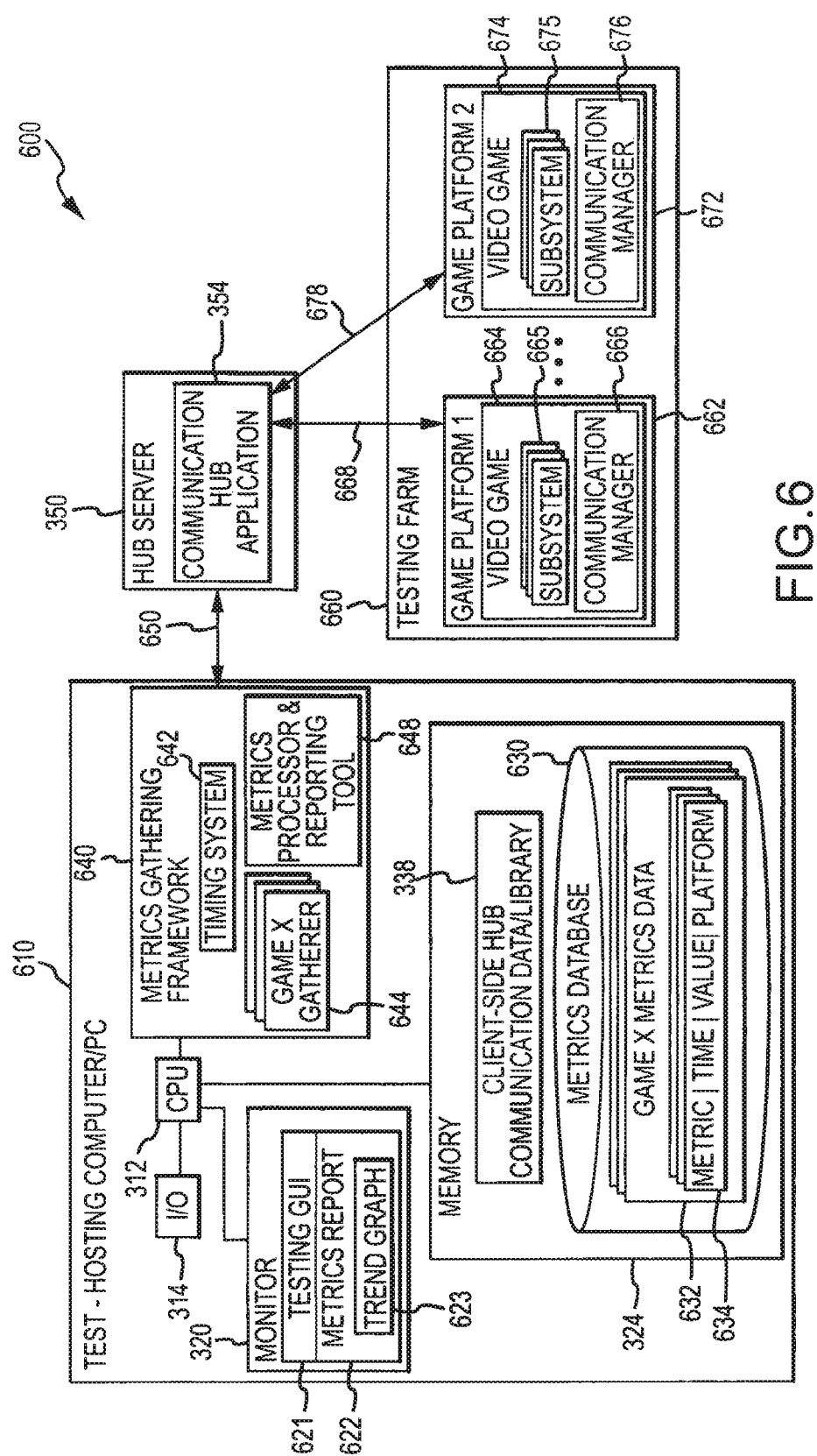
FIG. 6 is a functional block diagram of a game testing system or network according to an embodiment of the invention showing use of a metrics gathering framework or software suite/application along with a communications hub application to perform test-hosting PC-to-game platform communications and to support remote (or off console) performance/load testing of video game software.

FIG. 6 is a functional block diagram of a game testing system or network 600 according to an embodiment showing use of a metrics gathering framework or software suite along with a communications hub application to facilitate test-hosting PC-to-game platform communications and to support remote (or off console) metrics gathering from differing types/configurations of video game platforms. The testing system 600 includes a number of components similar to those discussed in detail with the system 300 of FIG. 3 with like numbers being used for those components and the description of FIG. 3 is applicable to FIG. 6.

For example, the system 600 includes a hub server 350 running a communications hub application 354 that functions to receive over link 650 messages (e.g., game metric collection instructions/orders) from a metrics gathering framework 640 running on test-hosting computer 610. These messages on link 650 are formatted according to a client-side hub communications data/library 638 (which may be a built-in library for framework 640 or accessed in memory 324 of test-hosting computer 610). The hub application 354 may act to process the metric-gathering instruction messages to determine a set recipients specified in the message (e.g., as defined by a distribution system/application of framework 640 (not shown)) or, in some cases, from content of the messages on link 650. The received messages transmitted to hub server 350 over link 650 by metrics gathering framework 640 are then reformatted/translated for each recipient (e.g., one or more of the game platforms 662, 672) based on communications data for that recipient (e.g., what format does platform 662 or 672 expect/require as discussed above) and forwarded to those recipients via a network or a direct connection 668, 678.

Likewise, the developer computer system 610 is similar to system 310 in that it includes a CPU 312, I/O devices 314, and a monitor 320 for displaying information including gathered and processed metrics data in testing GUI 621 (e.g., as a metrics report 622 that may simply present gathered metrics data in tabular form or as a trend or other graph 623 that may display metric values for one or more platforms over a test or a particular time period).

The system 610 also uses the CPU 312 to run a metrics gathering framework 640 (e.g., a set or suite of software applications such as modules useful for performing the performance/load testing of the present invention including reactive gathering of additional metrics/performance data upon identifying particular metric values such as an FPS value that is unacceptably low). The GUI 621 may be useful for displaying availability and status of game platforms 662, 672 (e.g., each platform/console may be shown with its configuration (e.g., Playstation®, Xbox®, Nintendo GameCube® and version), its present test state (e.g., running test function/step "X"), and/or the like). The GUI 621 may also present a tester using the host PC 610 access to game gatherer tools/modules 644 to allow the tester to choose to run a metrics gathering routine that is game specific on testing farm 660 (as discussed more below) and, in some cases, which platforms 662, 672 on which to run the performance test defined by the game gatherer code 644 (or this may be handled by a distribution system of framework 640). In system 600, the metrics gathering framework 640 is able to link to and communicate with the communications hub application 354 using a client side library 338 that defines how to interface and communicate with the hub application 354 including how to format metrics-gathering messages (instructions/orders/queries defined by gatherer routines/tools 644).

As shown, the metrics gathering framework 640 may include a number of subroutines or software-implemented systems that it utilizes to implement performance/load testing of game software. For example, the framework 640 may be used to externally test video game software 664, 674 run on game platforms 662, 672 in testing farm 660, which is in communication with hub server 350 via links 668, 678. As shown, the testing framework 640 includes a timing system 642 that functions to track the timing of transmission of testing instructions, which may be used to determine a status of the game 664, 674 at the time of the metrics gathering and is indicative at least of when a query was made to the game 664, 674 (but a communications manager 666, 676 may also timestamp gather metric values). The time data may be stored at least temporarily in memory 324 in metrics data for later processing, e.g., for use in graphing performance of a game platform 662, 672 over time as may be displayed in GUI 621 in graph 623 or otherwise reported 622 or otherwise reported to a tester using host PC 610.

Additionally, the metrics gathering framework 640 is shown to include one or more game-specific game gathering systems or routines 644. The gatherer 644 may be written to provide metric gathering instructions for a particular game ("game-specific") to all or a subset of game platforms 662, 672 regardless of type/hardware and software configuration. When the framework 640 runs a game gatherer 644, testing instructions are generated and transmitted over the links 650 and 668, 678 to game platforms 662, 672 via hub application 354. Each of the video games 664, 674 may include a number of subsystems in its software such as physics simulation, rendering, artificial intelligence, and the like that use processor, memory, and other resources of the platforms 662, 672.

Significantly, the metrics gathering framework 640 is run on the test-hosting computer 610 rather than running on the platform 662, 672 that is also running the video game software 664, 674. However, on or as a layer of each game 664, 674, an automation or communication manager 666, 676 is provided to process the testing instruction messages from the metrics gathering framework 640. The automation manager or module 666, 676 typically is provided on each platform 662, 672 to facilitate communications with the framework 640 and to implement metrics gathering instructions and return performance/metrics data to test-hosting computer 610. A relational database 630 may be provided in memory 324 (or elsewhere in memory accessible by framework 640) to store the gathered metrics data as shown with game metrics data 632 that may include records 634. For example, a game gatherer 644 may request a set of performance metrics be gathered for each game 664, 674 in a testing farm 660, and the metrics data 632 may include a record for each metric. Each record 634 may include a field with the metric's name, a time the metric value was gathered from a platform, a value of the metric, and an identifier for the platform. The communication manager 666, 676 may be implemented as a thin layer associated with the game software 664, 674 that provides hook ups or mapping to game code to carry out metric-gathering and other performance testing instructions (e.g., to determine current frames per second (FPS)) and to perform exception handling. The automation manager 666, 676 generally is adapted to send metrics data 632 via hub 350 to framework 640 as the data is observed/collected (e.g., the data is typically not stored in memory of the game platform 662, 672).

The framework 640 further includes a metrics processor and reporting tool 648. This subsystem of the framework 640 may be used to process the received metrics data 632 and to generate reports. For example, the tool 648 may present a metrics report 622 in GUI 621. Further, a tester may interact with tool 648 to request that historical trend data be generated for one or more metrics over time. In one case, the FPS values for a subset of the platforms 662, 672 is plotted over a tester-selected time period to allow the differences in frame rates on the various platforms to be easily identified and compared.

From the above discussion, it can be seen that the testing system 600 provides a number of advantages. Performance or load testing can be almost entirely external to the video game environment with the metrics gathering framework 640 run upon and gathered metrics data 632 stored in memory 324 on a test-hosting computer 610 communicatively linked to the platforms 662, 672. The performance testing may be performed concurrently over numerous platforms 662, 672 of differing types/configurations using a generic set of metrics-gathering code 644. The communication hub application 354 allows the gathering code 644 to be neutral with regard to particular platforms such that they can be run on all target platforms (e.g., the hub application 354 is able to communicate test instructions to all platforms 662, 672) regardless of the differences in hardware and/or software among the platforms 662, 672.

Another advantage in the performance/load testing provided by system 600 is that it may be configured to be reactive to the received metrics data or to test results. For example, one or more of gatherer tools 644 of the framework 640 may include conditional instructions ("conditionals") that when evaluated (e.g., by framework 640 based on received data 632 or the like) causes additional steps/functions defined in the metrics gatherer subroutine 644 to be carried out as part of the performance testing. The memory 324 may store testing limits or conditional parameters for this use. For example, a game developer may require that a game be rendered at 30 FPS and this value for a conditional (minimum frames per second) may be stored as a testing limit, and a framework 640 may include a conditional to compare an existing/reported frames per second of a game platform 662, 672 with this testing limit. When the conditional is satisfied (e.g., frames per second is less than 30 FPS), one or more additional instructions/orders may be issued by the framework 640 to the particular game platform 662, 672 such as to retrieve processor data, to gather additional performance metrics such as memory usage and remaining, and so on. The conditionals may be nested, too, to allow additional troubleshooting steps or data collection to be performed (e.g., if upon a conditional being satisfied, check to see if another conditional is met or platform/game is in a particular operating state).

One of the powerful features of metrics gathering systems and methods described herein is that they make use of bi-directional communication between the metrics gathering framework and the game platforms. In this manner, a game platform, via a communications manager or the like, may report during a performance/load test certain performance metrics that are out of tolerance (e.g., not within testing limits), and the "external observer" in the form of the metrics gathering framework may request additional information (e.g., drill down to obtain data useful in troubleshooting a programming bug such as an infinite loop or the like).

Figure 7:
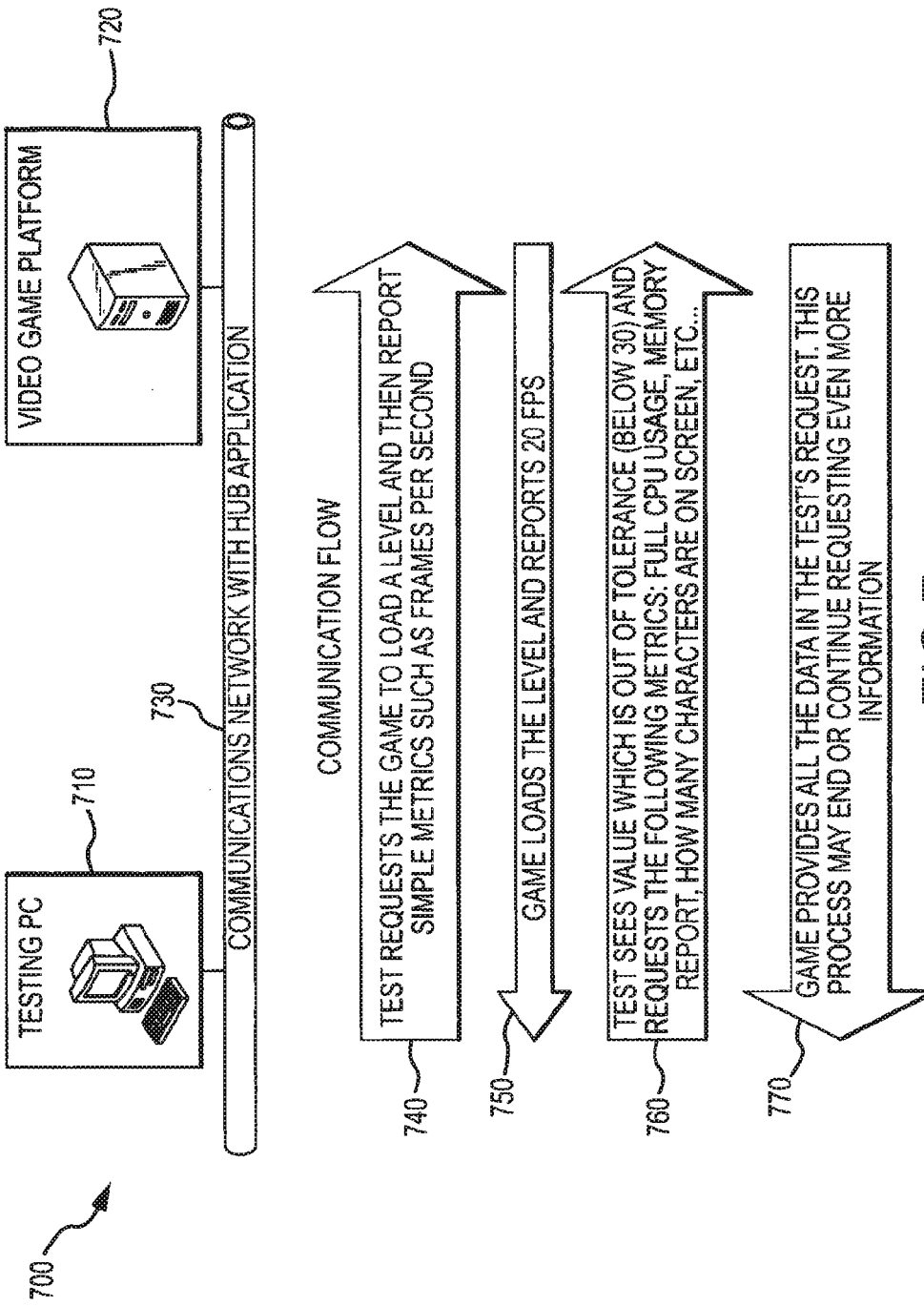
FIG. 7 is a schematic illustration of a portion of performance testing system or network illustrating bi-directional communications between a metrics gathering framework on a test-hosting device and a platform or console running video game software during a performance or load test of the game software.

FIG. 7 is a schematic illustration of a portion of testing system or network 700 illustrating bi-directional communications between a metrics gathering framework on a test-hosting device 710 and a platform or console 720 running video game software during a test of the game software. The host PC 710 and its performance metric-gathering framework may transmit platform-neutral testing instructions or queries for performance information to a game platform 720 to retrieve a metric value via a communications network/link that includes a communications hub application 730, which functions as described above to reformat the message to a form understood/expected by the game platform. Likewise, the communication hub in network 730 acts to receive metrics data/communication messages from the video game/platform 720 that it reformats and transmits to the metrics gathering framework on test-hosting computer 710 for further processing.

FIG. 7 illustrates an exemplary bi-directional communication flow that may occur during a performance test run in the testing system 700. A tester may initiate a game-specific metrics gathering module or script to cause the framework to begin testing of platform 720. The framework on device 710 may communicate orders as shown at 740 via communications network and hub application 730 to the game platform 720 to initiate running of a game and, in some cases, to initiate performance of a particular portion of the game to allow metrics to be gathered during a particular state of the game (what is load on platform at particular points in game play and the like). Further, the framework on host PC 710 may request that one or more performance metrics be gathered from the platform 720.

As shown in the exemplary communication 740, the framework may request the game on platform 720 to load a level and, if successfully loaded, to report performance metrics, such as frames per second (FPS), to the metrics gathering framework on test-hosting PC 710. In response, at 750, the game on platform 720 loads the level (without failure in this example) and reports back its present frames per second metric. In game development, it is common to establish a set of acceptable performance metrics or test limits, and it is common for a test limit/performance metric for frames per second to be greater than about 30 FPS. Hence, at 760 in operation of system 700, it is shown that the metrics gathering framework on test-hosting PC 710 determines that the received value for a metric (e.g., frames per second) is out of tolerance (e.g., below the predefined test limit of 30 FPS at 20 FPS).

Also, at 760, the metrics gathering framework is shown to respond to this determination by issuing a request to the video game on platform 720 for additional performance metrics (game or platform data). For example, the gathering routine or module (e.g., module 644 in framework 640) may include a conditional that causes the metrics gathering framework, when the FPS metric is less than 30 FPS, to request metrics useful in troubleshooting why a metric is outside of tolerance, e.g., for a low frames per second metric, the testing framework may request the game provide full CPU usage (e.g., where the CPU time was being spent when FPS was low), a memory report (e.g., how much memory is available), characters on the screen, and the like. In other words, the "external observer" in the form of the metrics gathering framework demands more data in order to drill down further to get more information so that game developers/programmers can determine why the FPS dropped to its present unacceptably low level (or why another metric has moved outside an acceptable range).

At 770, the video game on platform 720 collects and provides/reports all the requested additional data specified in the metric-gathering instruction/request. The test framework on testing PC 710 may process this data to produce test results to report to a tester/developer or may request additional information (e.g., perform further troubleshooting in an interactive and/or conditional manner such as if the memory report indicates that less than a certain amount of memory is available to obtain an additional metric value or the like). The communications shown in FIG. 7 between the metrics gathering framework (external observer) on host PC 710 and the game being tested on the platform/console 720 allows for extremely powerful tests. For example, with reference to FIG. 6, the timing data obtained by the timing system 642 can be used to determine when the frames per second metric was out of range during the performance/load test. By answering the question of "when" a game's performance dropped out of tolerance, the metric gathering framework 640, via gatherer mechanism 644 that may include conditionals, can act to additionally determine the "how" and "why" that cause the unacceptable performance (e.g., what caused the performance to suffer).

Figure 8:
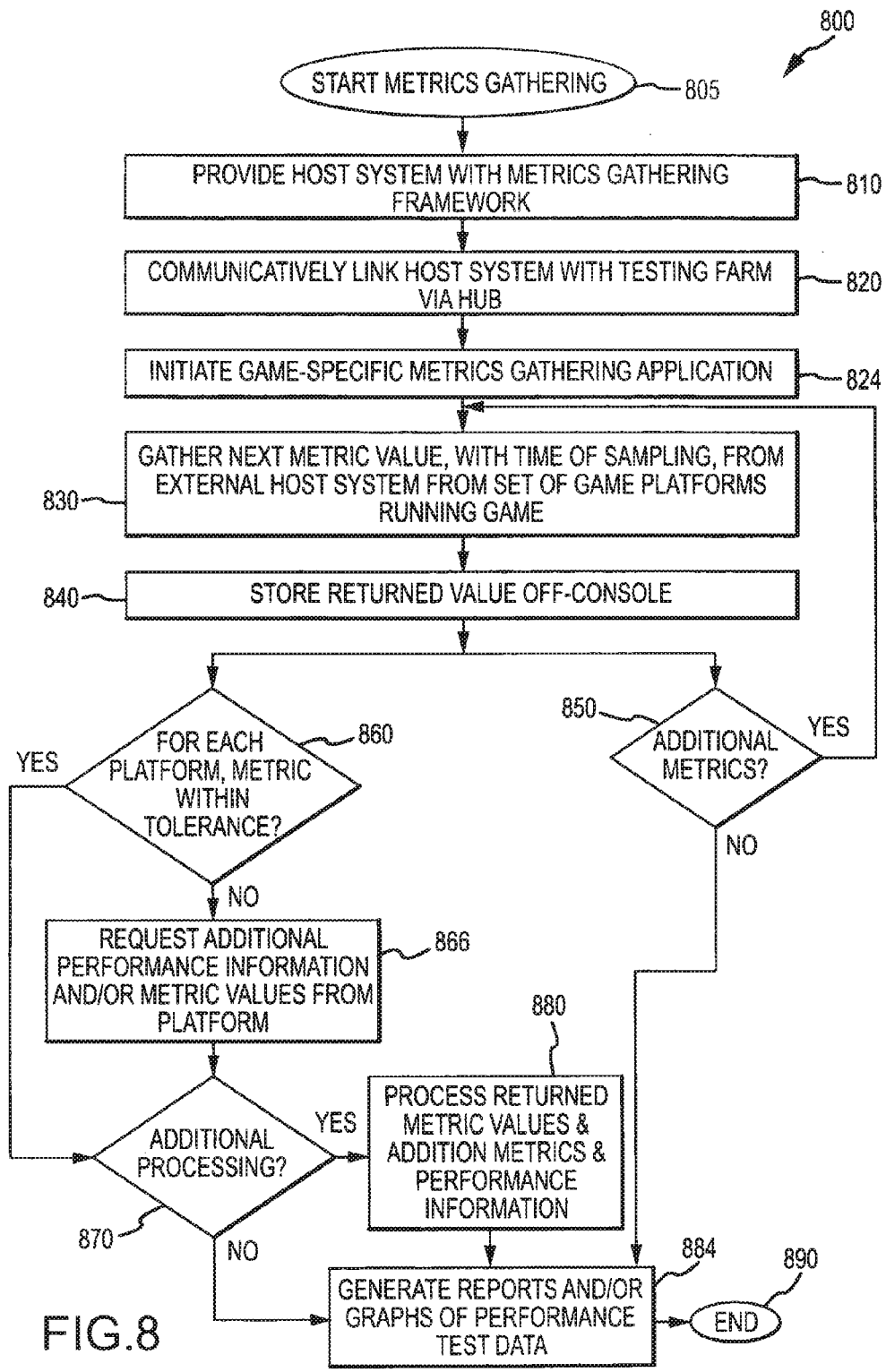
FIG. 8 is a flow chart illustrating steps or processes carried out in an exemplary performance/load testing method such as may be carried out by operation of the testing system of FIGS. 6 and 7 with a metrics gathering framework on a remote/off-console host computer system.

With the above descriptions in mind, it may be useful now to discuss an automated testing method and how the use of test scripts and external/remote testing may be accomplished. FIG. 8 is a flow chart illustrating steps or processes carried out in an exemplary performance testing method 800 such as may be carried out by operation of the testing systems of FIGS. 6 and 7. At 805, the performance testing 800 begins such as with designing a performance or load test for a particular video game that is under development. Such test design may include determining which performance metrics should be collected from game platforms of a testing farm while the game software/code is being executed (e.g., during game play).

Further, the testing may be reactive in nature in that conditionals may be included such that when a metric value is determined to be out of a preset range or "out of tolerance/test limits" additional metrics or performance information may be collected. This is achieved due to the bi-directional nature of communications between the metrics gathering framework and the games running on the game platforms. Hence, the design of the performance test may include setting up a number of performance tests that if "failed" cause additional metrics or performance information to be gathered for later analysis. For example, a memory metric such as megabytes of memory remaining may indicate a code/programming issue that can be followed up with obtaining additional metrics such as memory usage and/or what the memory is being used for by the game software.

In step 810, a host computer system is loaded or provided access to a metrics gathering framework as described above that is adapted with one or more subroutines/software subsystems to collect and process metrics data and performance information from game platforms. At step 820, the host system running or providing the metrics gathering framework is communicatively linked (in a wired or wireless manner) to a testing farm with differing types (or similarly configured) game platforms via a communications hub application/hub server. Each of the games may include a thin automation or communications layer that is provided to handle the requests for metrics data during the performance test and to communicate retrieved values/data back to the host system via the hub application.

At 824, the method 800 continues with a tester or user of the host system initiating game-specific metrics gathering from a set of the game platforms of the linked testing farm. At 830, the metrics gathering framework initiated at 824 generates and transmits a metric query/request message via the hub application to the test set of game platforms in the testing farm. Note, the metrics are gathered externally (not with an embedded performance testing application running on the console), and this allows the readings/values to be more true measurements of the actual performance of the platform/game. For example, the game does not run slower due to the processor concurrently running a performance test application on the console with the game software. At 830, the game (or its communication/automation manager) acts to collect the requested performance metric (such as a frame rate that may be provided in FPS) and transmit a message with the performance test data back to the host system via the communications hub application.

At 840, the method 800 continues with the metrics gathering framework acting to store the returned value in off-console memory. For example, a relational database may be used to store the performance test data to facilitate efficient access to all the stored data for later processing and analysis of the test results. At 850, the test 800 may continue with the metrics gathering framework determining whether there are additional performance metrics to collect from the game platforms. If not, the method 800 may end at 890, but, if there are more metrics to collect at 850, the method 800 may continue at 830 with gathering the next metric.

Concurrently (or sequentially) with such metric gathering, the method 800 may include with processing conditionals involving a subset of the gathered metrics. At 860, for each platform that may be concurrently transmitting metrics (in response to the hub concurrently transmitting metrics request messages to two or more platforms at 830), the method 800 may include determining whether the metric value is within a predefined tolerance (e.g., within performance test limits defined for the performance testing of a particular video game). If within tolerances, the method 800 may continue with determining whether additional processing is to be performed. If not, the method 800 may continue with generating one or more reports/graphs based on the collected metric values and/or performance test data (such as providing tables of metric values collected from the various platforms, generating trend charts for a particular value for one or more game platforms over the test period, and so on). The method 800 may then end at 890 or return to step 850 for determination of more metrics to collect and process during the performance test 800.

If the metric value is determined to be outside acceptable tolerances (the conditional is met/satisfied) at 860, the method 800 continues at 866 with requesting additional performance and/or metric values from the particular game platform. This may be considered to provide iterative and reactive troubleshooting during performance testing of a game. To this end, the conditionals of 860 and 866 may be nested such as by providing one or more additional conditionals as instructions/statements within a conditional to further drill down into performance information of a game or platform to determine what is causing a performance problem. As shown, the method 800 then continues at 870 with determining whether additional process is to be performed. If yes, the method 800 continues at 880 with processing the additional metrics and/or performance data, and then reports and/or graphs may be generated and provided to a tester by the metrics gathering framework. For example, it may be useful to rank the performances of game subsystems such as physics simulation, rendering, and the like to determine which is the worst performing as this may indicate where a problem with coding/game design lies so as to hasten correction/troubleshooting.

In a specific example, a testing farm may be provided with game platforms with two, three, or more differing types/configurations, and each platform may be used to run or execute software for a video game. Performance or load testing may be initiated that requests a metric value such as the current frames per second (FPS) of the game on each platform. The metrics gathering platform may compare the returned frame rate values against a predefined tolerance/test limit (e.g., 30 FPS or the like). If determined to be out of tolerance, the metrics gathering framework may generate a request for a predefined set of additional performance metrics and/or performance data. In the low FPS example, the framework may request the CPU statistics, which may vary widely amongst the game platforms. These CPU stats may be processed by the framework (or another software system) to determine which of the subsystems of the game software is the poorest performing system(s). Then, the metrics gathering framework may request performance metrics or statistics that are particular to the poorest performing or offending subsystem. Additional performance data that may be collected to assist in troubleshooting an identified problem or potential coding issue may include a wide variety of data such as memory usage, memory remaining, a full memory report, full CPU usage or CPU statistics, screen shots, metrics for a particular game element (such as an added character), how many characters are presently on the screen, and so on.

As discussed above, the time that metrics are gathered is also determined and stored with the gathered metrics, and this allows trending analysis to be performed. For example, a graph or view of performance of two or more games on differing types of game platforms can readily be graphed or charted over the testing period. Such historical trending may be useful for allowing a game developer to quickly identify portions of the game code that work better on one platform than another or that may provide unacceptable performance on a particular game platform.

Figure 9:
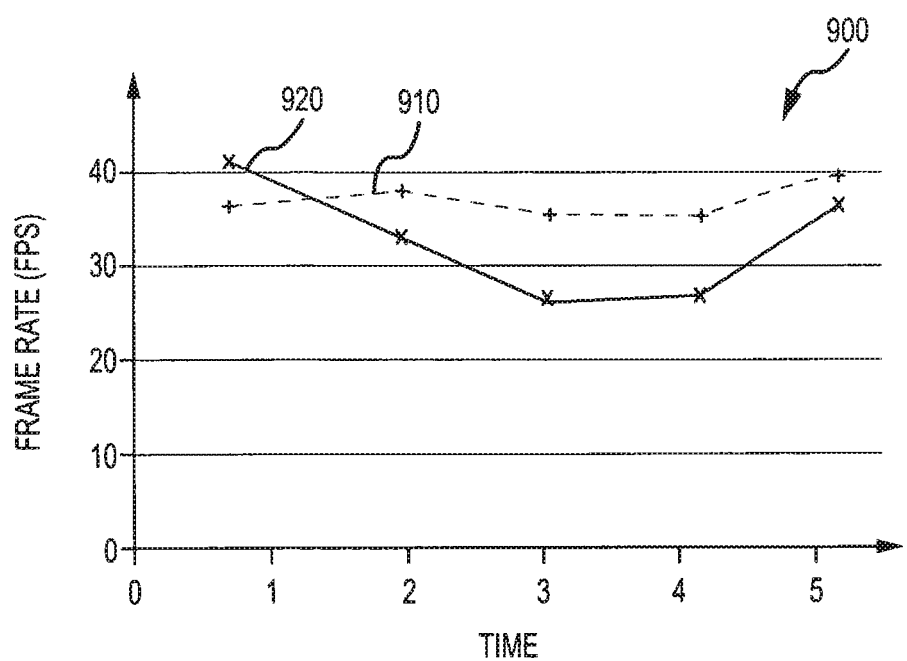
FIG. 9 is a trending graph showing measured frame rates over a testing period for two game platforms running a video game.

For example, FIG. 9 illustrates a graph 900 showing a first line 910 representing measured frame rates (in FPS) over a test period for a first game platform (such as for a Playstation 3® console or the like). A second line 920 is provided that represents a similar measurement of frame rates (in FPS) over the same testing period on a second game platform that differs from the first platform in software and/or hardware (e.g., an box® console or the like). As can be appreciated from graph 900, a metrics gathering framework may transmit requests for the game platforms of a testing farm to collect the frame rate metric five times during the test and the returned values can be plotted as shown for the two platforms (as shown with lines 910, 920).

The first game platform is shown to provide an acceptable frame rate throughout the test, if 30 FPS is the acceptable lower level for frame rate on the platforms, but the frame rate does slow at the time of the third and fourth samples. However, the graph 900 shows that the second game platform is unable to maintain the desired frame rate, and line 920 dips below the tolerance limit of 30 FPS between the time of the second and fifth samples to rates near 20 FPS (which may appear jerky to a game player). If additional metrics are gathered in response to the samples at times 3 and 4, a tester or game developer may be able to more effectively debug the tested game software (e.g., CPU usage at times 3 and 4 may show which game software subsystem is performing poorly, which may indicate a coding bug).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A video game testing system for externally testing performance of game software on game platforms, comprising:

a plurality of game platforms running a video game including for each of the game platforms a processor running a first game subsystem and a second game subsystem;

a communications hub communicatively linked with the game platforms; and a metrics gathering framework running on a computer system communicatively linked with the communications hub, the metrics gathering framework requesting a metric value from the game platforms via the communication hub, receiving the metric values from the game platforms, and storing the metric values in memory of the computer system, each of the metric values relating to performance of a corresponding one of the game platforms during the running of the video game, wherein messages requesting the metric values are configured based on a client-side communications library providing communication protocols for the communications hub, wherein the communications hub receives the metric value-request messages and generates game platform test messages from the received messages based on differing communication libraries for each of the game platforms, and wherein, for at least one of the game platforms, the metrics gathering framework uses the metric values to determine and compare performance of the first and second game subsystems to determine which is a poorer performing subsystem.

2. The system of claim 1, wherein the game platforms comprise game consoles of at least two hardware and software configurations and wherein the metrics gathering framework is neutral with reference to the hardware and software configurations.

3. The system of claim 1, wherein a time is associated with each of the received metric values and wherein the metrics gathering framework performs a trending analysis for the metric value over a time period.

4. The system of claim 1, wherein the metrics gathering framework further compares, for each of the game platforms, the received metric value with a performance tolerance limit, and, when the tolerance limit is exceeded, the metrics gathering framework generates a request for additional performance information from the game platform.

5. The system of claim 4, wherein the received metric value is a frame rate.

6. The system of claim 5, wherein the additional performance information comprises data associated with memory usage on the game platform or a screen shot.

7. The system of claim 1 wherein the metrics gathering framework further generates a request for additional performance information from the game platform for the poorer performing subsystem.

8. A method for performance testing a video game, comprising:

providing a metrics gathering framework run by a processor of a test-hosting computer;

with the metrics gathering framework, generating a test instruction defining a performance metric for the video game;

transmitting a message including the test instruction to a plurality of game platforms running the video game and communicatively linked to the testing framework;

receiving from each of the game platforms a value of the performance metric, wherein the value of the performance metric is an indicator of operational performance of the game platform during the running of the video game; and for each of the game platforms, comparing the received value with a tolerance limit for the performance metric and when the tolerance limit is exceeded, issuing a request to the game platform for additional performance data, wherein the operation of each of the game platforms during collection of the value of the performance metric is substantially similar to operations during collection of the additional performance data, whereby the running of the video game is not modified by performance testing.

9. The method of claim 8, further including, based on the received values of the performance metric, generating and transmitting one or more additional messages to a subset of the game platforms requesting additional performance data, including a screen shot or metrics for a game element corresponding to the video game, from the subset of the game platforms.

10. The method of claim 8, wherein the performance metric is a frame rate.

11. The method of claim 10, wherein the additional performance data comprises at least one of metrics for a game element corresponding to the video game, data associated with memory usage on the game platform, and a screen shot.

12. The method of claim 8, further comprising, with the metrics gathering framework, determining a worst performing subsystem of the video game on the game platform and wherein the metrics gathering framework further generates a request for additional performance information from the game platform for the determined worst performing subsystem.

13. The method of claim 8, wherein the transmitting of the message comprises concurrently transmitting the message to the game platforms from a communications hub and wherein the message is formatted in a form accepted by each of the game platforms.

14. A system for testing video games, comprising:

a plurality of video game platforms running a video game; and a test-hosting computer system communicatively linked to each of the game platforms and providing a metrics gathering framework, wherein the metrics gathering framework generates a plurality of messages each defining at least one performance metric corresponding to operation of the game platforms while running the video game and transmits the messages for concurrent delivery to the game platforms and wherein an automation module is provided on each of the game platforms to, in response to receipt of one or more of the messages from the metrics gathering framework, communicate values for the performance metrics gathered from the game platform to the metrics gathering framework, wherein the metrics gathering framework, for each of the game platforms, compares at least one of the values of the performance metrics to a performance tolerance and, when the tolerance is exceeded, the metrics gathering framework generates a message to the game platforms requesting additional performance data, and wherein the operation of each of the game platforms during collection of the values of the performance metrics is substantially similar to operations during collection of the additional performance data, whereby the running of the video game is not modified by performance testing.

15. The system of claim 14, wherein the video game platforms comprise at least two differing types of game consoles.

16. The system of claim 14, wherein the metrics gathering framework stores the values for the performance metrics in a relational database provided apart from the game platforms.

17. The system of claim 14, wherein the at least one value of the performance metrics is a frame rate for a platform to run the video game and the additional performance data includes at least one of metrics for a game element corresponding to the video game, data associated with memory usage on the game platform, and a screen shot.

* * * * *